US010734092B2

(12) United States Patent
Smith et al.

(10) Patent No.: US 10,734,092 B2
(45) Date of Patent: Aug. 4, 2020

(54) SATELLITE CONTROL SYSTEM

(71) Applicant: HONEYWELL INTERNATIONAL INC., Morris Plains, NJ (US)

(72) Inventors: Douglas Edward Smith, Phoenix, AZ (US); Don Crippen, Glendale, AZ (US); Joshua Matthew Stiles, Surprise, AZ (US); Mostafa Sayed, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/444,390

(22) Filed: Jun. 18, 2019

(65) Prior Publication Data
US 2020/0148396 A1  May 14, 2020

Related U.S. Application Data

(62) Division of application No. 14/595,580, filed on Jan. 13, 2015, now Pat. No. 10,370,125.

(51) Int. Cl.
*G12B 7/00* (2006.01)
*G01D 3/036* (2006.01)

(52) U.S. Cl.
CPC .............. *G12B 7/00* (2013.01); *G01D 3/0365* (2013.01)

(58) Field of Classification Search
CPC ........ G12B 7/00; G01D 3/0365; G01J 1/4228
See application file for complete search history.

(56) References Cited

U.S. PATENT DOCUMENTS

| 3,898,568 | A | | 8/1975 | Barth |
| 4,010,463 | A | | 3/1977 | Kay |
| 4,511,884 | A | | 4/1985 | Serev et al. |
| 4,989,001 | A | | 1/1991 | Serev |
| 5,134,397 | A | | 7/1992 | Eyerly et al. |
| 5,304,909 | A | | 4/1994 | Jin et al. |
| 5,557,285 | A | | 9/1996 | Bender et al. |
| 5,717,451 | A | * | 2/1998 | Katano ................ B41J 2/45 347/242 |
| 5,796,357 | A | | 8/1998 | Kushihara |

(Continued)

FOREIGN PATENT DOCUMENTS

CN      103968819 A      8/2014

OTHER PUBLICATIONS

EP Extended Search Report for Application No. 15193545.9-1557 dated Jun. 6, 2016.

*Primary Examiner* — David Z Huang
(74) *Attorney, Agent, or Firm* — Lorenz & Kopf, LLP

(57) ABSTRACT

A vehicle, a satellite control system, and a method for controlling the same are provided. The satellite control system, for example, may include, but is not limited to, a control moment gyroscope having a gimbal, at least one gimbal angle sensor configured to determine an angle of the gimbal, each gimbal angle sensor having an output circuit configured to output the determined angle, a signal conditioner circuit having substantially identical circuit topology as the output circuit, and a common mode error compensation circuit electrically coupled to the signal conditioner, the common mode error compensation circuit configured to determine common mode error in the gimbal angle sensor based upon a voltage output from the signal conditioner circuit and to output a signal to compensate for the common mode error.

6 Claims, 8 Drawing Sheets

(56) References Cited

U.S. PATENT DOCUMENTS

| | | | |
|---|---|---|---|
| 6,354,163 B1 | 3/2002 | Heiberg | |
| 7,057,399 B2 | 6/2006 | Khaykin et al. | |
| 7,298,967 B2 | 11/2007 | Chen et al. | |
| 7,340,370 B2 | 3/2008 | Kawaguchi | |
| 7,408,315 B2 | 8/2008 | Tsubota | |
| 9,813,027 B2 * | 11/2017 | Quaglietta | H03F 1/30 |
| 2009/0001220 A1 | 1/2009 | Peck et al. | |
| 2013/0015322 A1 | 1/2013 | Kusuda et al. | |

* cited by examiner

Determining a Common Mode Error in an Output Circuit of a Gimbal Angle Sensor in a Control Moment Gyroscope Based upon a Voltage Output by a Signal Conditioning Circuit, the Signal Conditioning Circuit Having Substantially Similar Circuit Topology as the Output Circuit

820

Compensating, by a Common Mode Error Compensation Circuit, the Gimbal Angle Sensor Based Upon the Determined Common Mode Error

SATELLITE CONTROL SYSTEM

CROSS-REFERENCE TO RELATED APPLICATION

This application is a divisional application of U.S. application Ser. No. 14/595,580, filed Jan. 13, 2015, now U.S. Pat. No. 10,370,125.

STATEMENT REGARDING FEDERALLY SPONSORED RESEARCH OR DEVELOPMENT

This invention was made with Government support under a Classified Contract number awarded by Outside Funding which is Classified. The Government has certain rights in the invention.

TECHNICAL FIELD

The present disclosure generally relates to satellites, and more particularly relates to reducing common mode error in satellite control systems.

BACKGROUND

Vehicles in space, such as satellites and other spacecraft, can be subject to widely fluctuating temperatures and to radiation in space. The radiation, for example, can cause undesirable ground loop current which can introduce error into the certain systems in the vehicle. The temperature fluctuations can also introduce error into a system in the vehicle as certain circuit elements in respective systems can be temperature sensitive. The error introduced into a specific system in the vehicle is sometimes consistent with the error in other systems in the vehicle, and, thus, is generally referred to as common mode error. However, because each system in the vehicle may be subject to the same common mode error, the common mode error can be difficult to detect and to remove.

BRIEF SUMMARY

In one embodiment, for example, a satellite control system is provided. The satellite control system may include, but is not limited to, a control moment gyroscope having a gimbal, at least one gimbal angle sensor configured to determine an angle of the gimbal, each gimbal angle sensor having an output circuit configured to output the determined angle, a signal conditioner circuit having substantially identical circuit topology as the output circuit, and a common mode error compensation circuit electrically coupled to the signal conditioner, the common mode error compensation circuit configured to determine common mode error in the gimbal angle sensor based upon a voltage output from the signal conditioner circuit and to output a signal to compensate for the common mode error.

In another embodiment, a vehicle is provided. The vehicle may include, but is not limited to, a first circuit having first circuit topology, the first circuit being subject to common mode error, a second circuit substantially having the first circuit topology, the second circuit being subject to substantially similar common mode error, and a common mode error compensation circuit electrically coupled to the second circuit, the common mode error compensation circuit configured to determine common mode error in the first circuit based upon a voltage output from the second circuit and to output a signal to the first circuit to compensate for the common mode error.

In yet another embodiment, a method for compensating a satellite control system for common mode error is provided. The method may include, but is not limited to, determining a common mode error in an output circuit of a gimbal angle sensor in a control moment gyroscope based upon a voltage output by a signal conditioning circuit, the signal conditioning circuit having substantially similar circuit topology as the output circuit, and compensating, by a common mode error compensation circuit, the gimbal angle sensor based upon the determined common mode error.

BRIEF DESCRIPTION OF THE DRAWINGS

The detailed description will hereinafter be described in conjunction with the following drawing figures, wherein like numerals denote like elements, and wherein:

FIG. 8 is a flow diagram illustrating an exemplary method for controlling a satellite control system, in accordance with an embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a satellite control system is provided. As discussed in further detail below, the satellite control system includes a signal conditioning circuit and a common mode error compensation circuit for detecting and removing common mode error from the satellite control system.

Figure 1:
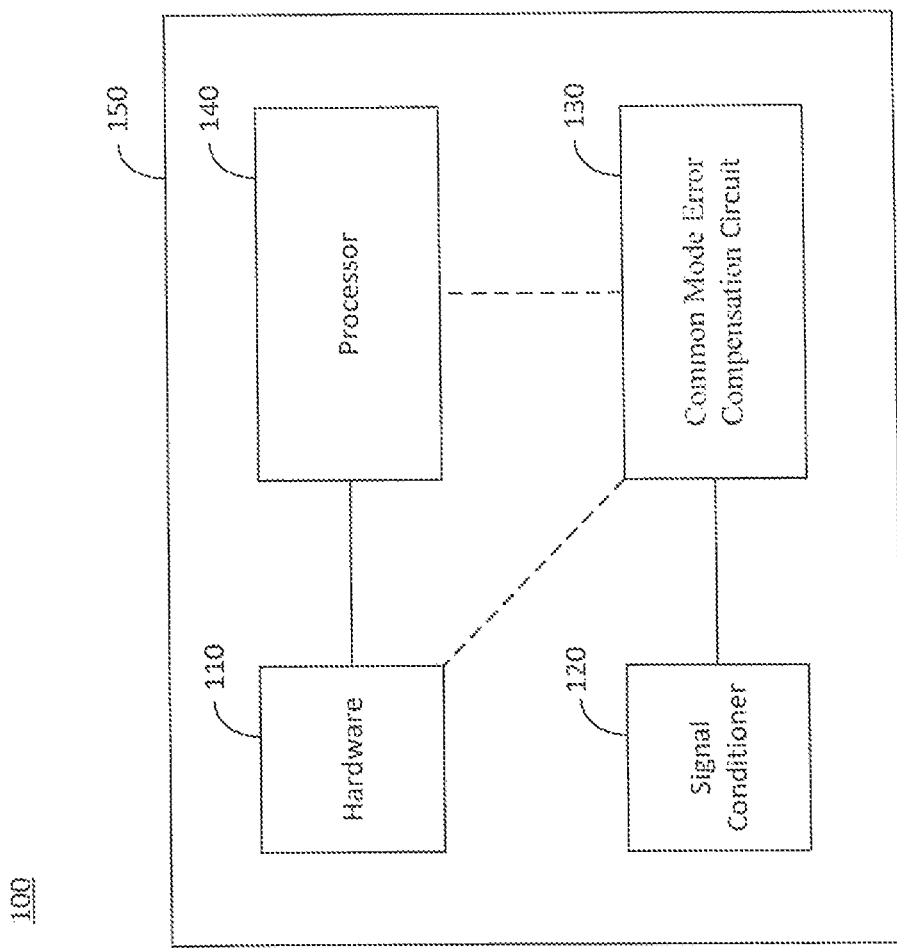
FIG. 1 is a block diagram of an exemplary satellite control system, in accordance with an embodiment.

FIG. 1 is a block diagram of an exemplary control system 100, in accordance with an embodiment. The control system 100 includes hardware 110 which may be susceptible to common mode error. In other words, multiple components of the hardware 110 may have a common error source causing a similar amount of error therein. In one embodiment, for example, the hardware 110 may be a gimbal angle sensor in a control moment gyroscope in a vehicle 150 such as a satellite. However, any complex signal conditioning circuit for a sensor system which encounters significant variation due to temperature change, or other change inducing phenomenon could take advantage of the techniques discussed herein.

Hereinafter the control system 100 is referred to as a satellite control system 100, however, one of ordinary skill in the art would recognize that the systems and methods described herein could be implemented in a variety of other vehicles (e.g., aircraft systems, spacecraft systems).

Common mode error is, as the name suggests, error introduced into a system which is common to multiple elements of the system. Common mode error can be introduced due to temperature fluctuations, ground loop current, magnetic coupling from other parts of the circuit, or powerful noise sources like motors, capacitive coupling, or the like. Temperature can affect the hardware 110 in a variety of ways. In general, certain materials expand and contract based upon an ambient temperature. The expansion/contraction can cause variations in resistance which can cause changes in voltages output by various systems. Ground loop current is undesired current on the ground plane which is common to multiple circuit elements. The ground loop current can introduce error into the hardware in a variety of ways. For example, if a circuit is configured to compare an input voltage to ground, a voltage on the ground plane due to ground loop current will alter the comparison. Inductive, or capacitive coupling of external or internal noise sources also reduces system accuracy. As discussed in further detail below, similarities in the coupling to a reference circuit are exploited to remove such coupling from a host of similar circuits. In the example of the gimbal angle sensor discussed above, the gimbal angle sensor may require very tight controls on resolver circuits in order to accurately measure an angle of the gimbal of the control moment gyroscope. In other words, the accuracy of a gimbal angle sensor may be dependent upon a resolver circuit receiving a very accurate and consistent voltage at the primary windings of the resolver circuit. Common mode error in the system can diminish the accuracy of the gimbal angle sensor by altering the voltage received at the primary windings of the resolver circuit. The system described herein is beneficial where a large number of similar, complex conditioning circuits are fed by a source which is too noisy to meet accuracy requirements. The techniques described herein reduce error in control moment gyroscopes by inserting a similar circuit into a correction loop such that most common noise sources experienced by the number of conditioning circuits are removed from those circuits reducing the noise.

In order to accurately remove the common mode error from the satellite control system 100, a signal conditioner 120 and a common mode error compensation circuit 130 are used. The signal conditioner 120 is arranged such that the signal conditioner 120 is subject to the same, or substantially the same, common mode error as the hardware 110. For example, the signal conditioner 120 may be arranged such that the signal conditioner 120 would experience the same or similar ambient temperature as the hardware 110 and, in some embodiments, may share the same ground plane as the hardware 110. In one embodiment, for example, the signal conditioner 120 may also have substantially the same circuit topology as the hardware 110. In other words, if the hardware 110 is a circuit for measuring a differential voltage on secondary windings of a resolver in a gimbal angle sensor and having a certain number of circuit elements arranged in a certain circuit layout, the signal conditioner 120 may have the exact, or substantially the exact, circuit elements as the hardware 110 which are arranged in the same, or substantially the same layout as the hardware 110. One of ordinary skill in the art would recognize that minor or irrelevant differences between the hardware 110 and the signal conditioner 120 would render the signal conditioner 120 substantially similar to the hardware 110.

The common mode error compensation circuit 130 is electrically coupled to the signal conditioner 120. The common mode error compensation circuit 130 compares a voltage output by the signal conditioner 120 with a reference voltage to generate an error signal. In one embodiment, for example, the reference voltage is generated by an absolute voltage reference chip which is thermally compensated, designed to have error much smaller than anything that it serves. As the voltage output by the signal conditioner 120 varies due to the common mode error, the error signal can be used to compensate the satellite control system 100 for the common mode error.

In one embodiment, for example, the common mode error compensation circuit 130 may output a compensation signal directly to the hardware 110 to compensate for the common mode error. In other embodiments, for example, the common mode error compensation circuit 130 may be coupled to a processor 140. The processor 140 may be any logic device including, but not limited to, a central processing unit (CPU), a physics processing unit (PPU), a graphics processing unit (GPU), a field programmable logic array (FPGA), a microcontroller, or any other logic device or combination thereof. The processor 140, for example, may offset a signal output by the hardware 110 based upon the output of the common mode error compensation circuit 130 to compensate for the common mode error experienced by the hardware 110.

Figure 2:
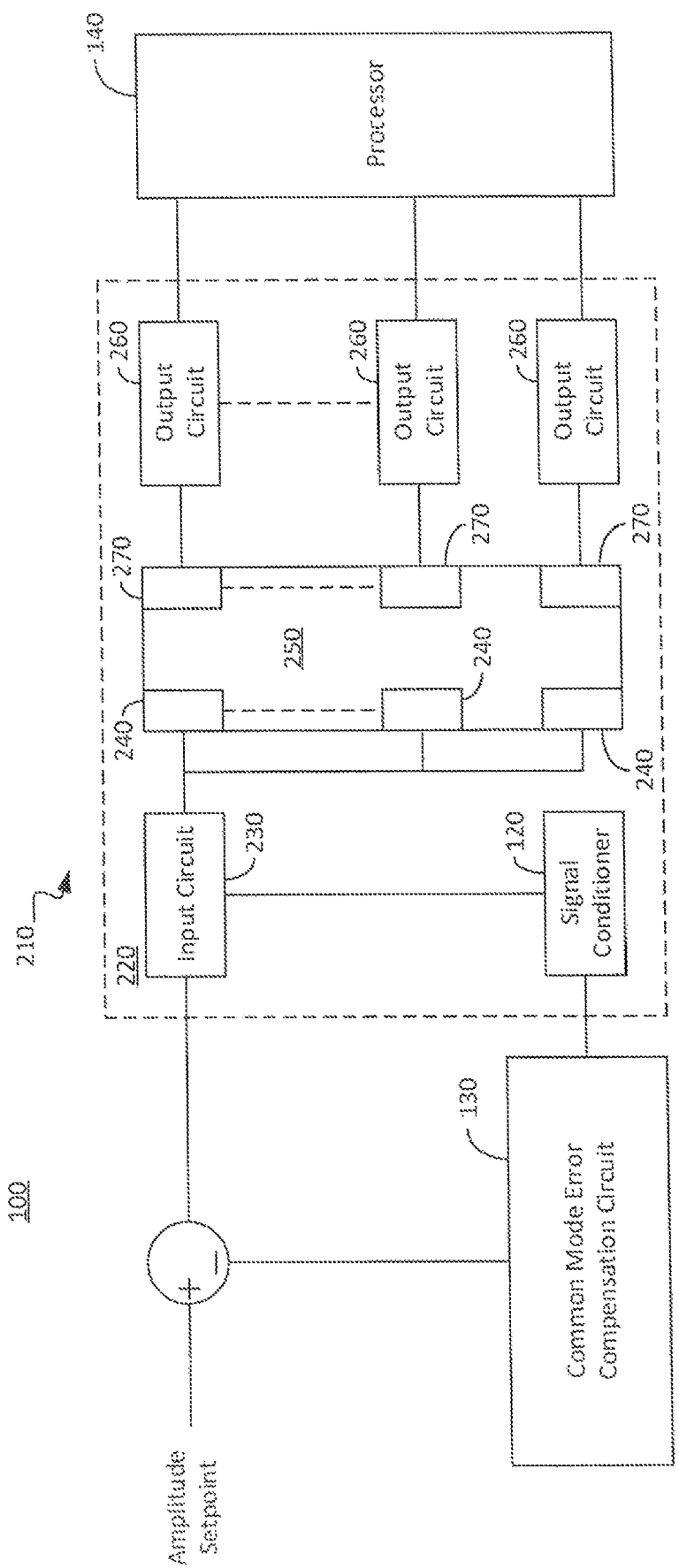
FIG. 2 is a block diagram of another exemplary satellite control system, in accordance with an embodiment.

FIG. 2 is a block diagram of another exemplary satellite control system 100, in accordance with an embodiment. The satellite control system 100 includes a control moment gyroscope 210. The control moment gyroscope 210 is an attitude control device. The configuration of the control moment gyroscope 210 may vary depending, but generally may include a spinning rotor and one or more motorized gimbals (not illustrated) that transfer the rotor's angular momentum to the satellite. As the rotor tilts, the changing angular momentum produces a gyroscopic torque that rotates the satellite. While the description herein with respect to FIG. 2 is discussed in the context of a satellite, one of ordinary skill in the art would recognize that the control moment gyroscope 210 and the control system discussed herein could be implemented in any vehicle, including, but not limited to, spacecraft, aircraft, or any system with multiple, complex angular measurements.

The control moment gyroscope 210 includes multiple gimbal angle sensors 220 for determining an angle of the gimbal of the control moment gyroscope 210. Each gimbal angle sensor 220 is fed a signal from an input circuit 230. The input circuit 230 outputs a signal used by the gimbal angle sensors 220 to determine the angle of the gimbal of the control moment gyroscope. The amplitude of the signal output by the input circuit 230 can be effected by the common mode error in the gimbal angle sensor 210. The input circuit 230 is coupled to the primary winding 240 of a resolver 250. Substantially similar output circuits 260 are coupled to each of the secondary windings 270 of the resolver 250. Because each of the output circuits 260 are substantially similar and are fed by the same input circuit 230, the common mode error affecting each of the output circuits 260 is substantially similar. In some instances, for example, there can be up to twenty or more of the output circuits 260 in the control moment gyroscope 250, each being affected by the common mode error in a substantially similar way. In one embodiment, for example, each output circuit 260 may be coupled to a processor 140 which controls the control moment gyroscope 210 based upon the determined angle of the gimbals.

As the control moment gyroscope 210 may be subject to common mode error, the satellite control system 100 further includes a signal conditioner 120 and a common mode error compensation circuit 130. The signal conditioner 120 is arranged such that the signal conditioner 120 would experience the same ambient temperature as the components of the control moment gyroscope 210 and, in some embodiments, may share the same ground plane as the components of the control moment gyroscope 210.

The signal conditioner 120 has substantially the same circuit topology as the output circuit 260. In other words, the signal conditioner 120 may have the exact, or substantially the exact, circuit elements as the output circuits 260 which are arranged in the same, or substantially the same layout as the output circuits 260. As discussed in further detail below, the voltage output from the signal conditioner 120 is developed into an error signal by the common mode error compensation circuit 130. As illustrated in FIG. 2, the error signal is used to compensate the input circuit 230 for the common mode error. The common mode error compensation circuit 130 may provide feedback to the input circuit 230 as illustrated in FIG. 2 and/or the processor 140 to compensate for the common mode error in the gimbal angle sensors 220. For example, if a common error source (say temperature, for instance) causes the output of the resolver secondary output signal conditioners to rise by a value of x volts. The value of x volts would be a complex function of the responses of all the parts in the conditioner acting together. If the x volts were permitted to enter the output circuits assigned to convert the angle information to digital form, then the x volts would be an unacceptable source of error. This exact common error also appears in the signal conditioner 120. However because the system utilizes the signal conditioner 120 and the common mode error compensation circuit in the resolver primaries servo feedback loop, control system 100 can modify its output to compensate for the x volts in a direction opposite to the x volts in order to satisfy its amplitude reference value. In other words, the value of the x volts did not come from the real excitation output so the output of the common mode error compensation circuit will be varied opposite x in response to detecting the error. Accordingly, the error negating effect output from the common mode error compensation circuit 130 will travel through all of the resolver secondaries to their output circuits 260, and there cancel the same common error being produced by those circuits.

Figure 3:
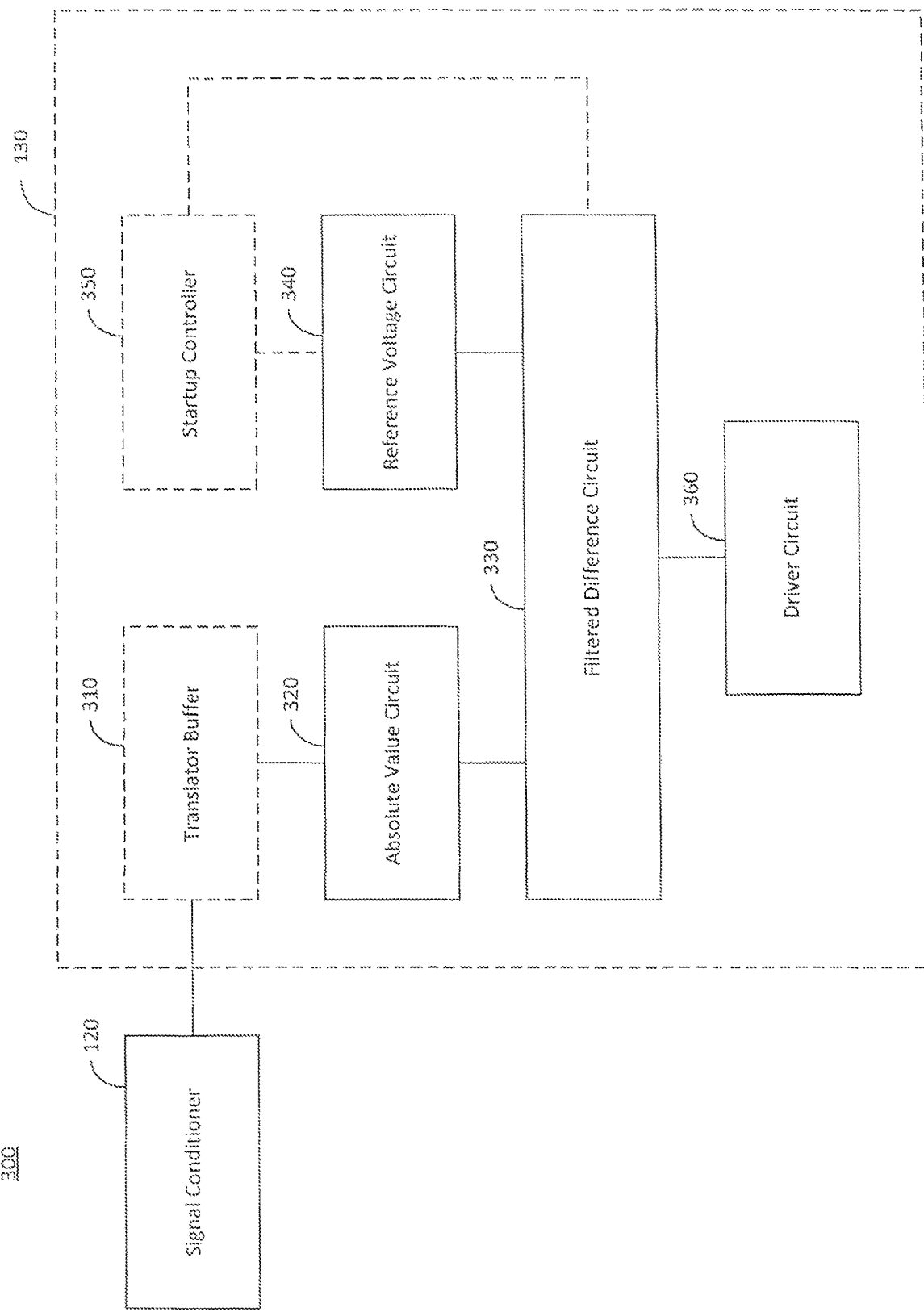
FIG. 3 is a block diagram illustrating an exemplary signal conditioner and a common mode error compensation circuit, in accordance with an embodiment.

FIG. 3 is a block diagram 300 illustrating an exemplary signal conditioner 120 and a common mode error compensation circuit 130, in accordance with an embodiment. As discussed in further detail below, the signal conditioner 120 outputs a voltage to the common mode error compensation circuit 130 which varies based upon the common mode error in the satellite control system 100.

In one embodiment, for example, the voltage output from the signal conditioner 120 may first be input into a translator buffer 310. The translator buffer 310 may offset the voltage output from the signal conditioner 120 by a fixed amount. In one embodiment, for example, the offset voltage may be 2.5 volts. However, one of ordinary skill in the art would recognize that the offset voltage may vary depending upon the needs to the common mode error compensation circuit 130. The value of the offset voltage may be chosen to offset the signal for resolver to digital converter integrated circuits because those integrated circuits may treat their analog inputs as if 2.5 volts was zero volts, and range from zero to five volts. Accordingly, the value of the translator buffer 310 can be chosen to match the resolver signals to the requirements of the integrated circuits. Furthermore, one of ordinary skill in the art would recognize that the offset voltage may not be necessary in certain embodiments because the voltage is tailored to the downstream processor requirements which can vary from system to system. In other words, if the downstream processor does not need the offset to operate correctly, then one would not need to provide it.

In the embodiment illustrated in FIG. 3, the voltage output from the translator buffer 310, or from the signal conditioner 120 in embodiments without the translator buffer, is input into an absolute value circuit 320. The output from the secondary windings 270 of the resolver circuit 250 illustrated in FIG. 2 is sinusoidal. Accordingly, the absolute value circuit 320 translates the sinusoidal voltage output from the signal conditioner into a near DC voltage proportional to the amplitude of the resolver excitation sine wave.

The DC voltage output from the absolute value circuit 320 is input to a filtered difference circuit 330. The filtered difference circuit 330 compares the DC voltage output from the absolute value circuit 320 with a known reference voltage output from a reference voltage circuit 340 to create an error signal corresponding to the difference between the two (control loop) while removing the signal conditioner common mode error in the satellite control system 100 at the same time. In one embodiment, for example, the reference voltage circuit 340 is generated by an absolute voltage reference chip which is thermally compensated, designed to have error much smaller than anything that it serves. In other words, the reference voltage circuit 340 is substantially isolated from the common mode error experienced by the rest of the system. Accordingly, as the output from the signal conditioner varies based upon the common mode error in the system, the filtered difference circuit 330 of the common mode error compensation circuit 130 can capture the common mode error by comparing the output to the common mode error isolated reference voltage circuit 340.

While FIG. 3 illustrates that the output from the filtered difference circuit is output to a driver circuit 360, the output from the filtered difference circuit could alternatively be transmitted to the processor 140 illustrated in FIGS. 1 and 2, or to both the processor 140 and the driver circuit 360.

In one embodiment, for example, the common mode error compensation circuit 130 may include a startup controller 350. The filtered difference circuit 330 and the reference voltage circuit 340, for example, may be feedback based circuits. In other words, the filtered difference circuit 330 and the reference voltage circuit 340 may base their respective output based upon an input signal. Accordingly, the startup controller 350 may place a default initial value on the feedback paths of the filtered difference circuit 330 and the reference voltage circuit 340 in order to define the feedback cycle.

In one embodiment, for example, the error signal is input into a driver circuit 360. The driver circuit 360 is coupled to the input circuit 230, as illustrated in FIG. 2. As discussed in further detail below, the driver circuit 360 compensates the input circuit 230 based upon the common mode error in the system to provide an as near as possible perfect amplitude sine wave to the resolver 250. The driver circuit 360 outputs a phase controlled sinusoidal signal, to compensate the excitation wave output by the input circuit 230 against a high level of common noise throughout the system.

Figure 4:
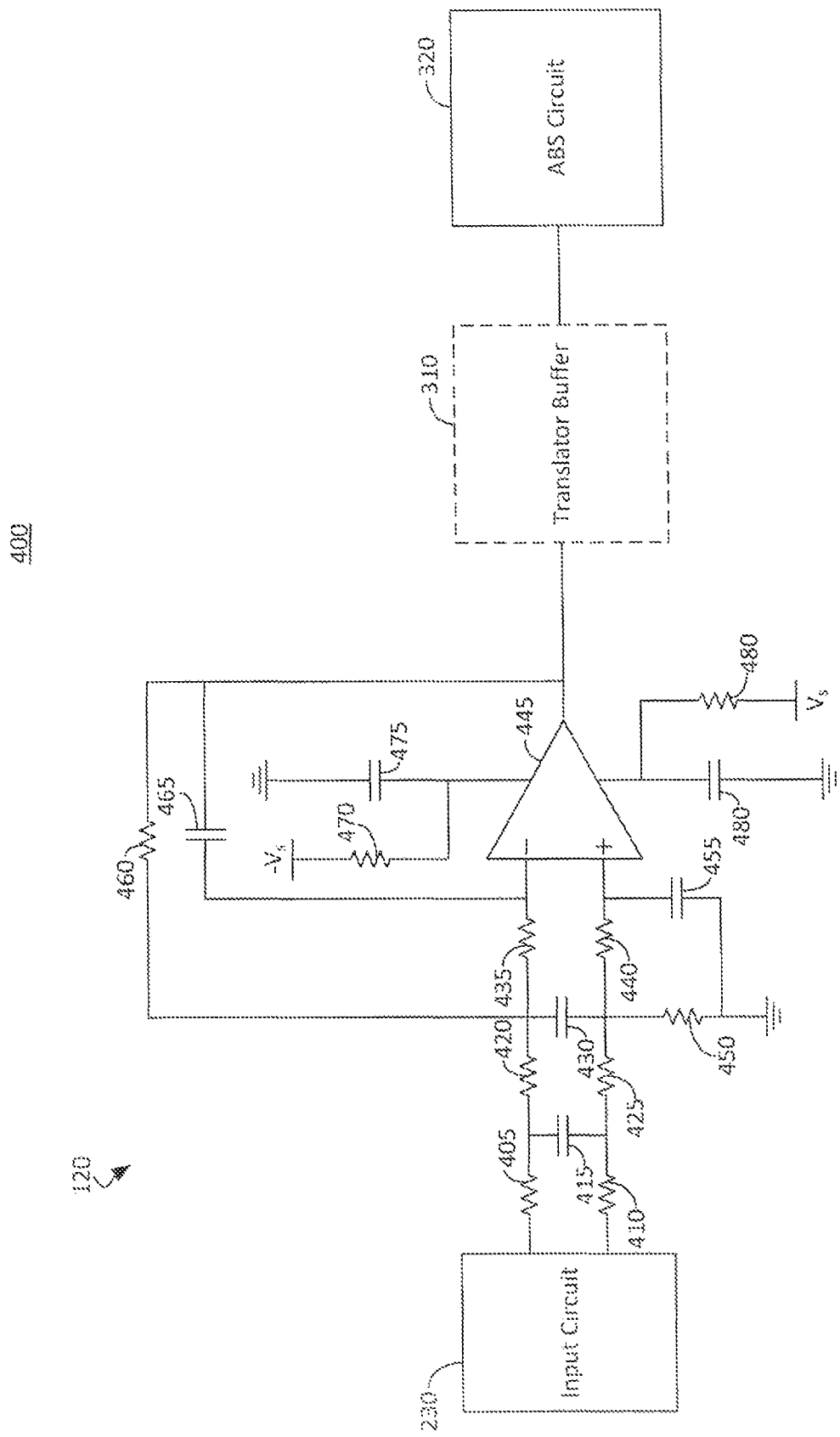
FIG. 4 is a circuit diagram of an exemplary signal conditioner, in accordance with an embodiment.

FIG. 4 is a circuit diagram 400 of an exemplary signal conditioner 120, in accordance with an embodiment. The signal conditioner 120 illustrated in FIG. 4 includes a resistor 405. A first end of the resistor 405 is coupled to a first of the secondary windings 270. A first end of a second resistor 410 is coupled to a second of the secondary windings 270. As discussed above, the secondary windings 270 may output a sinusoidal differential signal corresponding to an angle of a gimbal of the control moment gyroscope 210.

A capacitor 415 is coupled in parallel between the second ends of resistors 405 and 415. A first end of a resistor 420 is also coupled to the second end of the resistor 405. Likewise, a first end of a resistor 425 is coupled to the second end of the resistor 410. A capacitor 430 is coupled in parallel between the second ends of resistors 420 and 425. A first end of a resistor 435 is also coupled to the second end of the resistor 420. Likewise, a first end of a resistor 440 is coupled to the second end of the resistor 425. The second end of the resistor 435 is coupled to a negative input of an operational amplifier 445. The second end of the resistor 440 is coupled to the positive input of the operational amplifier 445. A resistor 450 is coupled between the second end of resistor 450 and a ground plane. As discussed above, the ground plane may be shared by the signal conditioner 120 and the gimbal angle sensors 220 such that the signal conditioner 120 captures any ground loop current that the gimbal angle sensors 220 would be subject to. A capacitor 455 is coupled between the ground plane and the positive input to the operational amplifier 445. A resistor 460 is coupled between the second end of resistor 420 and the output of the operational amplifier 445. A capacitor 465 is coupled between the input of the operational amplifier 445 and the output of the operational amplifier. The components 415-465 provide a low pass filter, high pass filter, and notch filter at key corner frequencies critical to the noise performance of the resolver 250.

The operational amplifier 445 is powered via a positive power supply $V_s$ and a negative power supply $-V_s$. A resistor 470 is coupled between the negative power supply $-V_s$ and the operational amplifier 445. A capacitor 475 is coupled between the resistor 470 and the ground plane. Likewise, a resistor 480 is coupled between the positive power supply $V_s$ and the operational amplifier 445. A capacitor 485 is coupled between the resistor 480 and the ground plane.

The voltage output by the operational amplifier 445 is electrically coupled to either the translator buffer 310 or the absolute value circuit 320. The voltage output by the operational amplifier 445 corresponds to a level of common mode error the satellite control system 100 is subject to as well as the signal used by the output circuits 260 as a decoding reference for the secondary resolver outputs.

Figure 5:
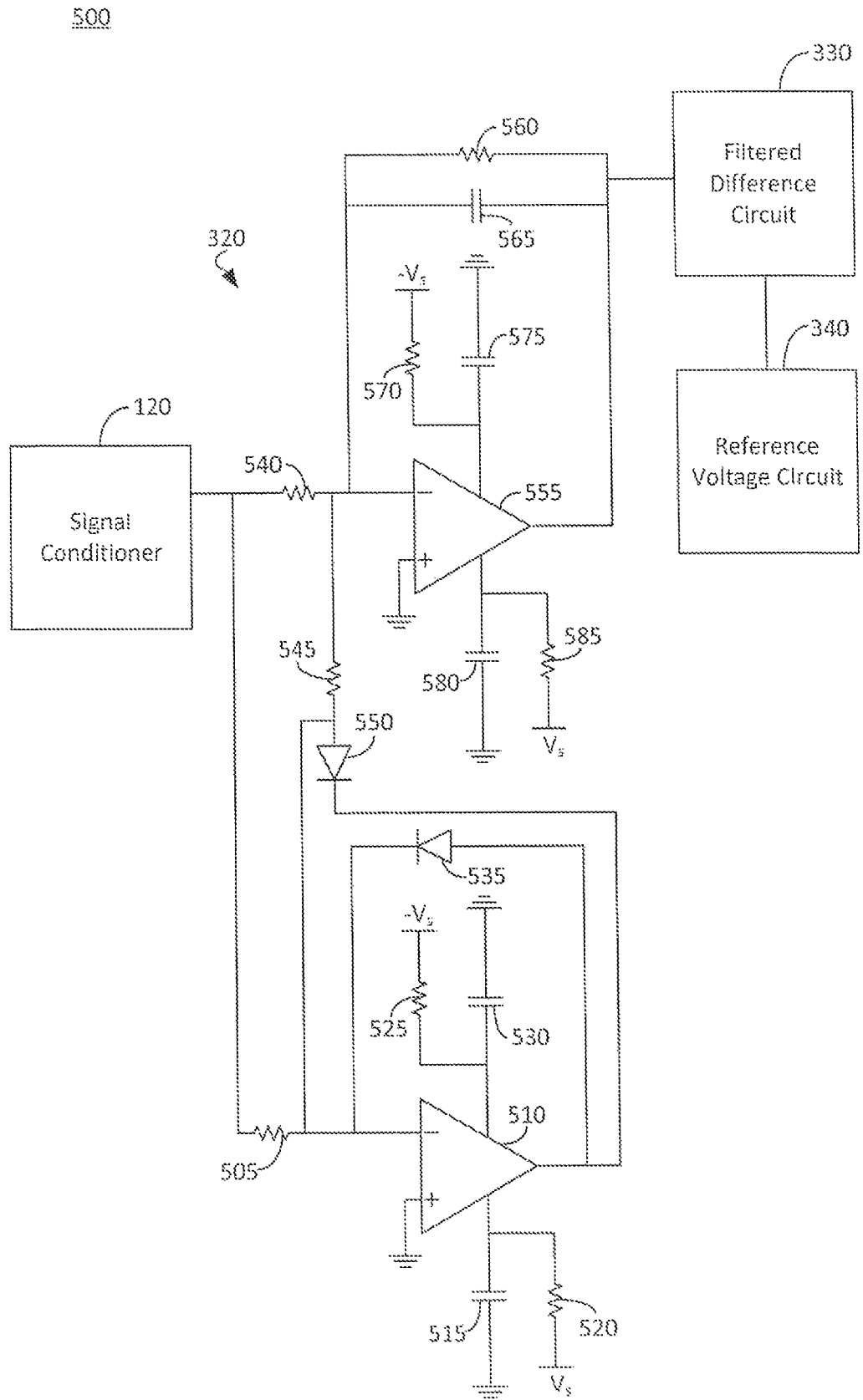
FIG. 5 is a circuit diagram of an absolute value circuit, in accordance with an embodiment.

FIG. 5 is a circuit diagram 500 of an absolute value circuit 320, in accordance with an embodiment. The absolute value circuit 320 receives input from either the signal conditioner 120, as illustrated in FIG. 5 or the translator buffer 310, as discussed above. A resistor 505 is coupled between the input to the absolute value circuit 320 a negative input to an operational amplifier 510. A positive input of the operational amplifier is coupled to the ground plane. The operational amplifier 510 is powered by a positive power supply $V_s$ and a negative power supply $-V_s$. A resistor 520 is coupled between the positive power supply $V_s$ and the operational amplifier 510. A capacitor 515 is coupled between the resistor 520 and the ground plane. Likewise, a resistor 525 is coupled between the negative power supply $-V_s$ and the operational amplifier 510. A capacitor 530 is coupled between the resistor 525 and the ground plane. A first end of a diode 535 is to the output of the operational amplifier 510. A second end of the diode 535 is coupled to the input of the operational amplifier 510. The diode is arranged to allow current to flow between the output of the operational amplifier 510 and the input of the operational amplifier 510.

A resistor 540 the input to the absolute value circuit 320. A second end of the resistor 540 is coupled to a first end of a resistor 545. The second end of the resistor 545 is coupled to the second end of the resistor 505. The second end of the resistor 545 is coupled to a first end of the diode 550. The second end of the diode 550 is coupled to the first end of the diode 535. The diode 550 is arranged to allow current to flow from the first end of the diode 550 to the second end of the diode 550. The circuit components 505-550 function to invert the negative voltage component of the sinusoidal input voltage received to a positive voltage.

The absolute value circuit 320 further includes an operational amplifier 555. A negative input of the operational amplifier 555 is coupled to the second end of the resistor 540. A positive input of the operational amplifier is coupled to the ground plane. The operational amplifier 555 is powered via a positive power supply $V_s$ and a negative power supply $-V_s$. A resistor 570 is coupled between the negative power supply $-V_s$ and the operational amplifier 555. A capacitor 575 is coupled between the resistor 570 and the ground plane. Likewise, a resistor 585 is coupled between the positive power supply $V_s$ and the operational amplifier 555. A capacitor 580 is coupled between the resistor 585 and the ground plane. A capacitor 565 is coupled between the negative input of the operational amplifier 555 and the output of the operational amplifier 555. A resistor 560 is also coupled between the negative input of the operational amplifier 555 and the output of the operational amplifier 555. The circuit components 555-585 function to filter the inverted sinusoidal voltage such that the output of the absolute value circuit is substantially a DC value corresponding to the common mode error in the satellite control system 100, added to the amplitude of the resolver excitation sine wave (i.e., the signal output from the input circuit 230). As illustrated in FIG. 5, the output of the absolute value circuit 320 is coupled to an input of the filtered difference circuit 330.

While FIG. 5 illustrates one example of an absolute value circuit 320, one of ordinary skill in the art would recognize that circuit topology and layout could vary while still achieving the same purpose.

Figure 6:
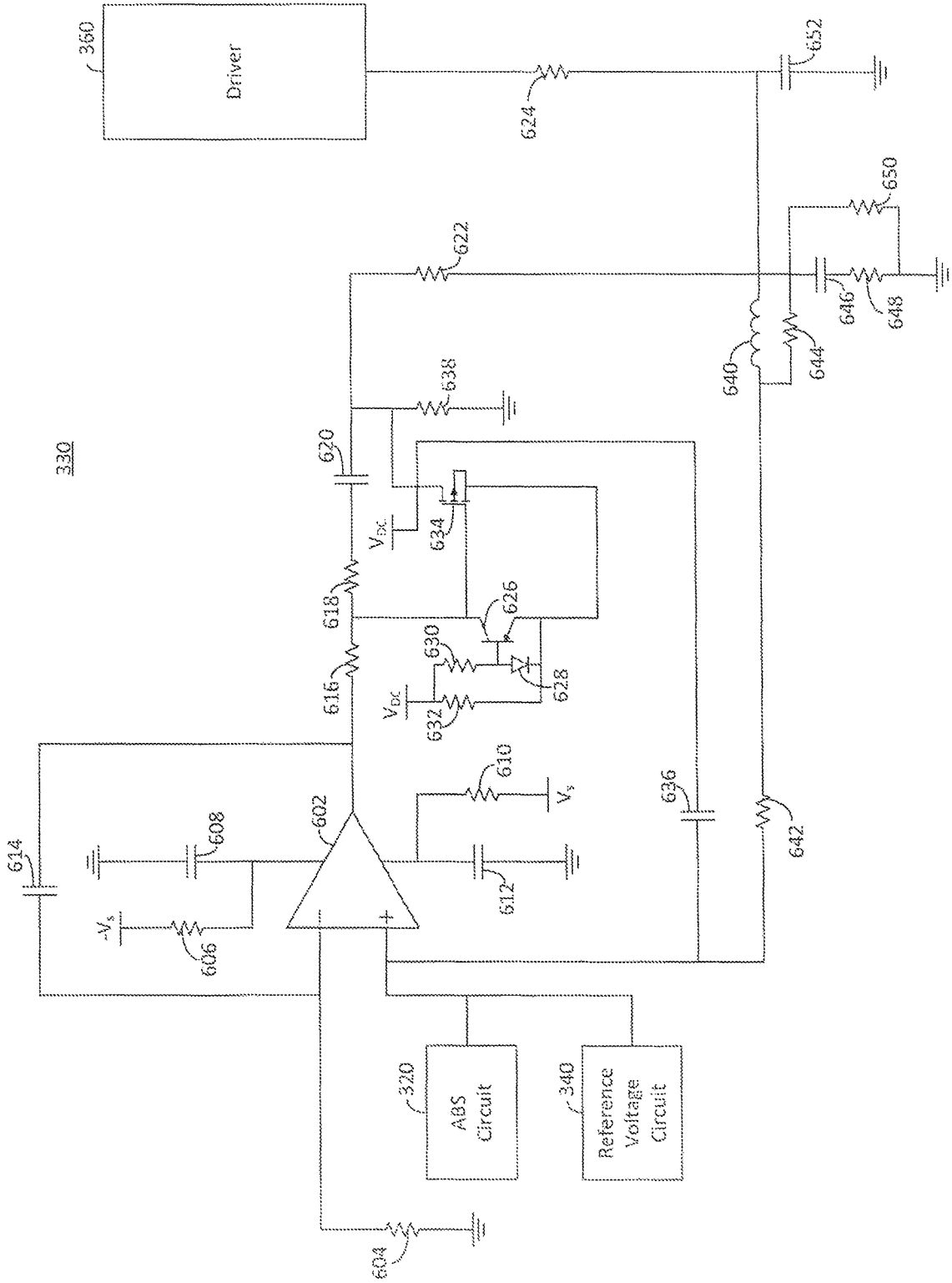
FIG. 6 is a circuit diagram of an exemplary filtered difference circuit, in accordance with an embodiment.

FIG. 6 is a circuit diagram of an exemplary filtered difference circuit 330, in accordance with an embodiment. As discussed above, the filtered difference circuit 330 receives an input voltage from the absolute value circuit 320 and a reference voltage circuit 340 and outputs a difference between the two input signals indicative of the common mode error in the satellite control system 100 plus the error in excitation sine wave amplitude from other error sources. In one embodiment, for example, the reference voltage circuit 340 may output a fixed voltage around −3 volts. However, one of ordinary skill in the art would recognize that the voltage of the reference voltage circuit 340 could vary depending upon the needs of a particular system.

Both the output from the absolute value circuit 320 and the reference voltage circuit 340 are connected to a positive input of an operational amplifier 602. The negative input of the operational amplifier 602 is coupled to the ground plane through a resistor 604. The operational amplifier 602 is powered via a positive power supply $V_s$ and a negative power supply $-V_s$. A resistor 606 is coupled between the negative power supply $-V_s$ and the operational amplifier 602. A capacitor 608 is coupled between the resistor 606 and the ground plane. Likewise, a resistor 610 is coupled between the positive power supply $V_s$ and the operational amplifier 602. A capacitor 612 is coupled between the resistor 610 and the ground plane. A capacitor 614 is coupled between the input to the operational amplifier 602 and the output of the operational amplifier 602. The circuit elements 602-614 function to output a voltage corresponding to the common mode error in the satellite control system 100 plus the amplitude error of the excitation sine wave from other non-common error sources. The difference between the reference voltage and the output of the absolute value circuit 320 regulates the amplitude of the excitation sine wave output from the input circuit 230. The difference in common mode response to noise between the excitation signal conditioning circuits, and the resolver signal conditioning circuits is likewise removed via the difference block action (at the same time).

The output of the operational amplifier is coupled to a first end of a resistor 616. The second end of the resistor 616 is coupled to a first end of a resistor 618. The second end of the resistor 618 is coupled to a first end of a capacitor 620. The second end of the capacitor 620 is coupled to a first end of a resistor 622. A second end of the resistor 622 is coupled to a first end of a resistor 624. In the embodiment illustrated in FIG. 6, a second end of the resistor 624 is coupled to the driver 360. As discussed in further detail below, the driver 360 drives a voltage to a primary winding of the resolver 250 illustrated in FIG. 2. However, in other embodiments, the voltage output by the differentiator 330 may be output to a processor 140 which compensates a signal output by the satellite control system 100.

The filtered difference circuit 330 further includes a transistor 626. A collector of transistor 626 is coupled to the second end of the resistor 616. A diode 628 is coupled between a base of the transistor 626 and an emitter of the transistor 626. The diode is configured to allow a flow of current between the base of the transistor 626 and the emitter of the transistor 626. A first end of a resistor 630 is also coupled to the base of the transistor 626. The second end of the resistor 630 is coupled to a power supply VDC. In one embodiment, for example, the power supply $V_{DC}$ may be 5 volts. However, one of ordinary skill in the art would recognize that the voltage could vary depending upon the needs of the system. A first end of a resistor 632 is also coupled to the power supply VDC. A second end of the resistor 632 is coupled to the emitter of the transistor 626.

The filtered difference circuit further includes a transistor 634. A source of transistor 634 is coupled to the emitter of the transistor 626. A gate of the transistor 634 is coupled to the collector of the transistor 626. A drain of the transistor 634 is coupled to the second end of the capacitor 620. The drain of transistor 634 is also coupled to a first end of capacitor 636. A second end of capacitor 636 is coupled to the positive input of the operational amplifier 602. A resistor 638 is coupled between the drain of transistor 634 and ground. The transistor 634 regulates the power voltage to the driver 360 based upon the error received at the filtered difference circuit 330. The drive sine wave amplitude is proportional to this power voltage. The transistor 634 also inverts the output of the filtered difference circuit 330 such that the amplifier 602 inputs are functionally reversed, and thus common error in the excitation circuits is subtracted from the common error of all of the similar resolver secondary signal conditioners through the resolver from the primary inputs of the resolvers (where the excitation signal enters the resolvers).

The differentiator further includes an inductor 640. A first end of the inductor is coupled to the second end of resistor 622. A first end of a resistor 642 is coupled to the second end of the inductor 640. A second end of the resistor 642 is coupled to the positive input of the operational amplifier 602. A first end of a resistor 644 is also coupled to the second end of resistor 622. A second end of the resistor 644 is coupled to the second end of inductor 640. A first end of a capacitor 646 is also coupled to the second end of resistor 622. A second end of the capacitor 646 is coupled to a first end of a resistor 648. A second end of the resistor 648 is coupled to ground. A resistor 650 is coupled between the first end of capacitor 646 and ground. The filtered difference circuit 330 further includes a capacitor 652. The capacitor 652 is coupled between the first end of resistor 624 and ground.

As the filtered difference circuit 330 compares the output from the signal conditioner 120 to the voltage output from the reference voltage circuit 340, the filtered difference circuit 330 can accurately capture any common mode error which exists in the satellite control system 100.

While FIG. 6 illustrates one example of a filtered difference circuit 330, one of ordinary skill in the art would recognize that circuit topology and layout could vary while still achieving the same purpose.

Figure 7:
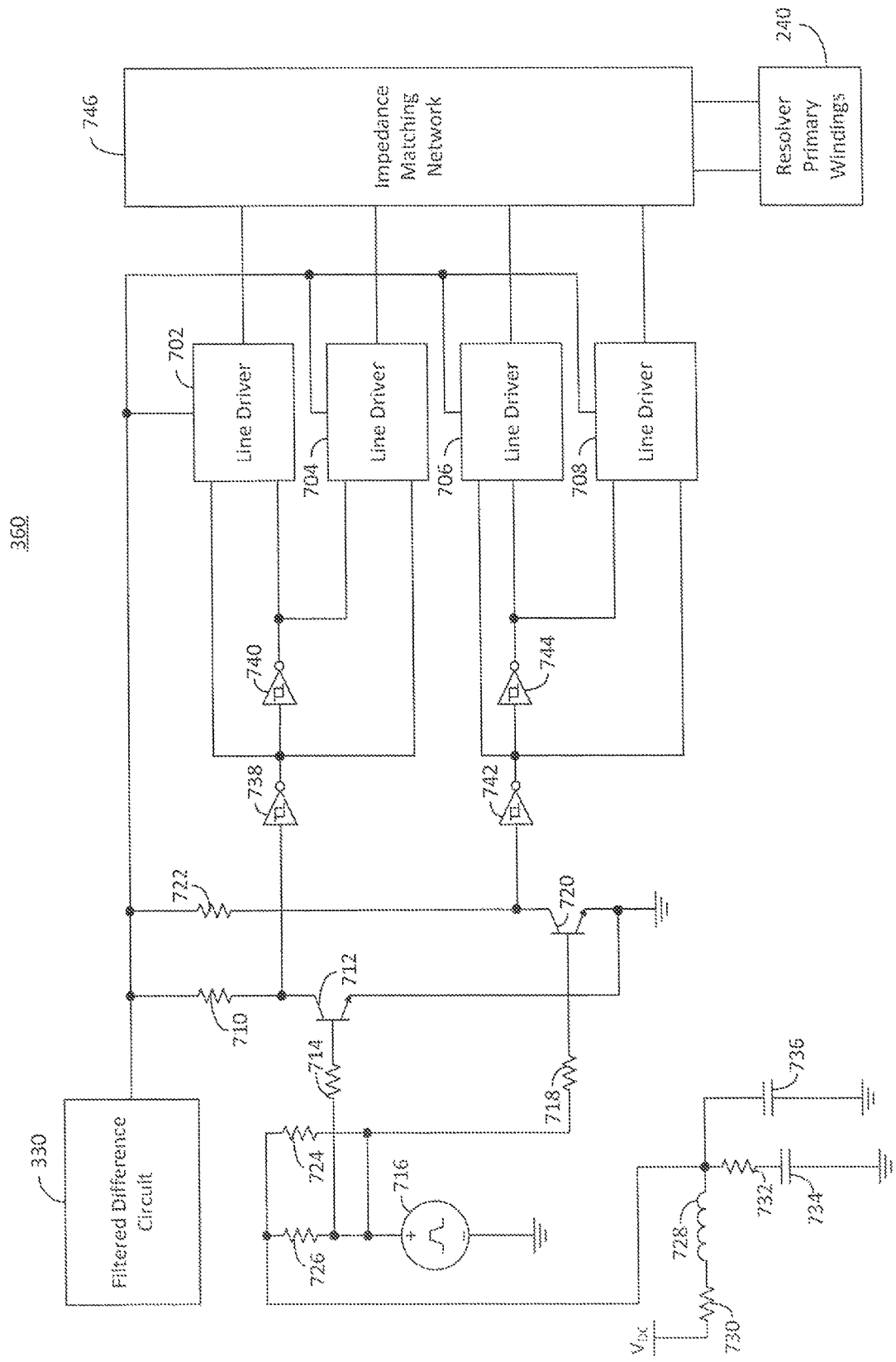
FIG. 7 is a circuit diagram of a driver, in accordance with an embodiment.

FIG. 7 is a circuit diagram of a driver 360, in accordance with an embodiment. As discussed above, the input to the driver circuit 360 is the output from the filtered difference circuit 330, and driven through the primaries to the secondaries of the resolver 250. The input from the filtered difference circuit 330 is coupled to lines drivers 702-708. Each of the line drivers 702-708 is configured to output a differential square wave signal at an operating range governed by the control loop. The square wave is converted to a sine wave on its way through the resolver 250 from primary windings to secondary windings. The specific amplitude of the voltage range of the differential sinusoidal signal is controlled based upon the error signal output by the filtered difference circuit 330. All of the line drivers 720-708 operate at the same time in response to a square wave input from the digital sections of the control moment gyroscope 210 whose frequency, and phase is closely regulated by the processor 140. As discussed above, there could be twenty or more gimbal angle sensors, thus, multiple line drivers may be required to provide enough current to drive them all. The operating voltage of the line drivers 720-708 which can vary from 2.3 to 5.5V which controls the amplitude of the excitation sine wave output by the input circuit 230. This amplitude is measured by the signal conditioner 120 via the loop illustrated in FIG. 2.

The driver circuit 360 further includes a resistor 710. A first end of the resistor 710 is coupled to the output of the filtered difference circuit 330. A second end of the resistor 710 is coupled to a collector of a transistor 712. A base of the transistor 712 is coupled to a first end of a resistor 714. A second end of the resistor 714 is coupled to a periodic voltage source 716. In one embodiment, for example, the periodic voltage source 716 may output a modulating voltage having an amplitude ranging from 0 volts to 5 volts, a pulse width of around one-hundred microseconds and a period of around two-hundred microseconds. However, one of ordinary skill in the art would recognize that the period and voltage of the periodic voltage source 716 could vary. The frequency and phase of the periodic voltage source 716 precisely determines the frequency and phase of the output of the driver circuit 360, and thus the frequency and phase of the excitation wave transmitted to the resolver primary windings 240.

A first end of a resistor 718 is also coupled to the output of the periodic voltage source 716. A second end of the resistor 718 is coupled to the base of a transistor 720. An emitter of the transistor 720 is coupled to ground. The emitter of the transistor 720 is also coupled to the emitter of the transistor 712. The collector of the transistor 720 is coupled a first end of a resistor 722. A second end of the resistor 722 is coupled to the output of the differentiator 330. A first end of a resistor 724 is coupled to the output of the periodic voltage source 716 and the first end of the resistor 718. A second end of the resistor 724 is coupled to a first end of a resistor 726. A second end of the resistor 726 is coupled to the second end of resistor 714 and the output of the periodic voltage source 716. The first end of the resistor 726 is also coupled to a first end of an inductor 728. A second end of the inductor 728 is coupled to a first end of a resistor 730. A second end of the resistor 730 is coupled to a power supply $V_{DC}$. In one embodiment, for example, the power supply $V_{DC}$ may be 5 volts. However, one of ordinary skill in the art would recognize that the voltage could vary depending upon the needs of the system. A first end of a resistor 732 is also coupled to the first end of the inductor 728. A capacitor 734 is coupled between the second end of the resistor 732 and ground. A capacitor 736 is coupled between the first end of the inductor 728 and ground. The transistors 712 and 720 provide a unique variable logic translation stage that translates logic from the periodic voltage source. In one embodiment, for example, the logic is proportional to the power voltage supplied to the drivers by the difference circuit 330. This logic guarantees correct digital switching across 3.9+/−41% logic supply range. The common collector circuits output a voltage which scales with the voltage output by the filtered difference circuit 330 and which follows the guaranteed trigger high and low requirements of the variable logic inverter, and driver chips. The driver circuit 360 allows the level translator to scale over a large range of logic values suitable for a continuous servo instead of a standard fixed logic conversion circuit.

A collector of transistor 712 is coupled to the input of a Schmitt trigger 738. An output of the Schmitt trigger 738 is input into line driver 702 and line driver 704. An output of the Schmitt trigger 738 is also coupled to an input of a Schmitt trigger 740. An output of the Schmitt trigger 740 is also input into line driver 702 and line driver 704. A collector of transistor 720 is coupled to the input of a Schmitt trigger 742. An output of the Schmitt trigger 742 is input into line driver 706 and line driver 708. An output of the Schmitt trigger 742 is also coupled to an input of a Schmitt trigger 744. An output of the Schmitt trigger 744 is also input into line driver 706 and line driver 708. The Schmitt triggers 738-744 activate all of the line drivers 702-708 half high, and half low with amplitude based upon the common mode, and general amplitude control error signal output from the difference circuit 330. The logic trip levels of the Schmitt triggers 738-744 vary proportionately with the power voltage applied to the drivers (from the difference circuit 330).

As discussed above, the gimbal angle sensor 220 requires that a consistent signal be transmitted to the primary windings 240 of the resolver 250. However, as discussed above, common mode error can cause amplitude variations in a fixed sinusoidal signal. Accordingly, by controlling the line drivers 702-708 amplitude based upon the common mode error signal received from the difference circuit 330, the driver 360 can output a signal to the primary windings 240 of the resolver 250 which is compensated for the common mode error in the satellite control system 100 (specifically in the output circuits 260 which are similar signal conditioners), providing a far more consistent voltage than current systems. The system described herein was found to reduce error in gimbal angle sensors by up to 25%, reducing angular error in the control moment gyroscope 210 from 8 arcminutes to 6.2 arcminutes.

An impedance matching network 746 is coupled between the parallel drivers 702-708, and the resolver primaries inductors which may be wired in parallel, as illustrated in FIG. 2.

FIG. 8 is a flow diagram illustrating an exemplary method 800 for controlling a satellite control system 100, in accordance with an embodiment. The method 800 includes determining a common mode error in an output circuit of a gimbal angle sensor in a control moment gyroscope based upon a voltage output by a signal conditioning circuit, the signal conditioning circuit having substantially similar circuit topology as the output circuit. (Step 810). As discussed above, because the signal conditioning circuit 120 has substantially the same circuit topology as the output circuit 260, the common mode error experienced by the output circuit can be captured in the signal conditioning circuit. The feedback loop (signal conditioner 120 and common mode error compensation circuit 130) inverts the common error as it enters the input circuit 230 adjusting the input circuit 230 so that when the output circuits 260 encounter the drive signal from the input circuit 230 through the resolver 250, the net result is zero common mode error. As discussed above, the common mode error in the satellite control system 100 can be determined by converting the voltage output by the excitation feedback signal conditioning circuit to a near DC amplitude value, and subtracting the same value in the secondaries signal conditioning circuits. This occurs while the primary function of the excitation control loop remains to hold the excitation amplitude against a voltage reference set point.

The method further includes compensating, by a common mode error compensation circuit 130, the gimbal angle sensor 220 based upon the determined common mode error. (Step 820). This common error is determined in the excitation servo sine wave amplitude feedback loop, and thus subtracted from the excitation amplitude before it can occur in the signal conditioning electronics between the resolver secondaries electronics, and the resolver to digital conversion process performed by the processor 140. This results in zero common error in the angle measurement which reduces total error substantially. As discussed above, in one embodiment a compensation signal can be transmitted to a processor to compensate the output of the gimbal angle. In other embodiments, for example, a common mode error compensated voltage can be transmitted to primary windings of a plurality of resolver circuits based upon the determined common mode error using, for example, the driver circuit 360 discussed above. As discussed above, by transmitting the common mode error compensated voltage to the primary windings of the resolver of the gimbal angle sensor, the accuracy of the gimbal angle sensor can be dramatically improved by subtracting out the error before it is added in (resulting in zero common error).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle, comprising:
a first circuit having first circuit topology, the first circuit being subject to common mode error;
a second circuit substantially having the first circuit topology, the second circuit being subject to substantially the same common mode error; and
a common mode error compensation circuit electrically coupled to the second circuit, the common mode error compensation circuit configured to determine the common mode error in the first circuit based upon a voltage output from the second circuit and to output a signal to the first circuit to compensate for the common mode error,
wherein the first circuit and the second circuit share a ground plane, and wherein the common mode error compensation circuit comprises:
an absolute value circuit electrically coupled to the second circuit, the absolute value circuit configured to convert the voltage output from the second circuit to a DC voltage;
a reference voltage circuit configured to output a reference voltage; and
a difference circuit electrically coupled to the absolute value circuit and the reference voltage circuit, the difference circuit configured to output the signal to compensate for the common mode error based upon a difference between the reference voltage and the DC voltage.

2. The vehicle of claim 1, wherein the first circuit and the second circuit are subject to a single ambient temperature.

3. The vehicle of claim 1, further comprising:
a resolver circuit, the resolver circuit comprising a primary winding and a secondary winding,
wherein the second circuit is electrically coupled to the primary winding of the resolver circuit and the first circuit is electrically coupled to the secondary winding of the resolver circuit.

4. The vehicle of claim 3, wherein the common mode error compensation circuit further comprises:
a driver circuit electrically coupled between the difference circuit and the primary winding of the first resolver, the driver circuit configured to output a common mode error compensated voltage to the primary winding based upon the signal to compensate for the common mode error output by the difference circuit.

5. The vehicle of claim 4, wherein the driver circuit comprises:
a plurality of line drivers, each of the plurality of line drivers configured to output a sinusoidal voltage in a different voltage range based upon the signal to compensate for the common mode error output by the difference circuit; and
a plurality of Schmitt triggers, each of the plurality of Schmitt triggers electrically coupled to at least one of the plurality of lines drivers, wherein the plurality of Schmitt triggers selectively activate at least one of the plurality of line drivers to output the common mode error compensated voltage to the primary winding based upon the signal to compensate for the common mode error output by the difference circuit.

6. The vehicle of claim 4, further comprising a plurality of resolver circuits, each of the plurality of resolver circuits having a primary winding electrically coupled to the output of the plurality of line drivers.

* * * * *